Patented Feb. 18, 1936

2,031,426

UNITED STATES PATENT OFFICE 2,031,426

DISAZO DYESTUFF

Georg Niemann, Ludwigshafen-on-the-Rhine, Germany, assignor to General Aniline Works, Inc., New York, N. Y., a corporation of Delaware No Drawing. Application May 16, 1935, Serial No. 21,901. In Germany June 2, 1934

1 Claim. (Cl. 260—44.5)

The present invention relates to a disazo dyestuff and a process of producing same.

I have found that a valuable disazo dyestuff is obtained by coupling tetrazotized 4,4'-diamino-3,3'-dichlordiphenyl with 1-(4'-methylphenyl)-3-methyl-5-pyrazolone. The dyestuff thus obtainable is distinguished by brilliant orange shades of color.

It is already known to prepare a disazo dyestuff by coupling tetrazotized 4,4'-diamino-3,3'-dichlordiphenyl and 1-phenyl-3-methyl-5-pyrazolone. This disazo dyestuff colors rubber shades which run during the vulcanization. It is also known to prepare a disazo dyestuff by coupling tetrazotized 4,4' - diamino-3,3'-dimethoxydiphenyl and 1-(4'-methylphenyl)-3-methyl-5-pyrazolone. This dyestuff has not the valuable brilliant orange shade of color as has the dyestuff obtainable according to the present invention and is not so easily dispersible in rubber.

Example

A solution of 1 molecular proportion of tetrazotized 4,4'-diamino-3,3'-dichlordiphenyl is added, while stirring, to an aqueous alkaline solution of two molecular proportions of 1-(4'-methylphenyl)-3-methyl-5-pyrazolone or to an aqueous suspension of this compound. The mixture is then stirred for some hours and the resulting dyestuff isolated in the usual manner. It colors rubber brilliant orange shades which are fast during the vulcanization. It is not soluble in benzene, acetone and other organic solvents.

What I claim is:

The disazo dyestuff corresponding to the formula:

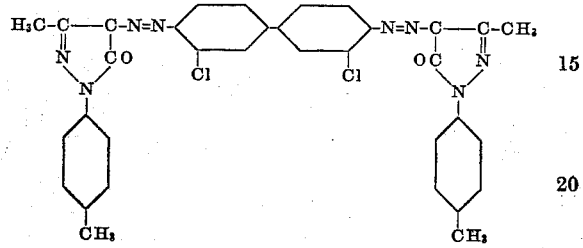

GEORG NIEMANN.